(12) United States Patent
Rosenboom

(10) Patent No.: US 6,718,892 B1
(45) Date of Patent: Apr. 13, 2004

(54) SEED METER

(76) Inventor: Lyn A. Rosenboom, 841 E. 3000 N. Rd., Clifton, IL (US) 60927

( * ) Notice: Subject to any disclaimer, the term of this patent is extended or adjusted under 35 U.S.C. 154(b) by 16 days.

(21) Appl. No.: 10/199,873

(22) Filed: Jul. 19, 2002

Related U.S. Application Data

(60) Provisional application No. 60/307,053, filed on Jul. 20, 2001.

(51) Int. Cl.$^7$ ................................................ A01C 7/00
(52) U.S. Cl. ..................... 111/185; 221/211; 221/254; 221/266
(58) Field of Search ................................ 111/183, 184, 111/185, 77, 182, 174; 221/266, 278, 211, 254, 203

(56) References Cited

U.S. PATENT DOCUMENTS

| | | | | |
|---|---|---|---|---|
| 4,047,638 A | * | 9/1977 | Harrer et al. ............... | 221/266 |
| 4,074,830 A | * | 2/1978 | Adams et al. ............... | 221/266 |
| 4,241,849 A | * | 12/1980 | Harrer ......................... | 221/266 |
| 4,600,122 A | * | 7/1986 | Lundie et al. ............... | 221/211 |
| 4,915,258 A | * | 4/1990 | Olson ......................... | 221/211 |
| 5,143,002 A | * | 9/1992 | Gaspardo ..................... | 111/185 |
| 5,170,909 A | * | 12/1992 | Lundie et al. ............... | 221/211 |
| 5,392,707 A | * | 2/1995 | Romans ....................... | 111/185 |
| 5,542,364 A | * | 8/1996 | Romans ....................... | 111/185 |
| 6,044,779 A | * | 4/2000 | Brown et al. ................ | 111/185 |
| 6,176,393 B1 | * | 1/2001 | Luxon ......................... | 221/211 |
| 6,516,733 B1 | * | 2/2003 | Sauder et al. ............... | 111/180 |

* cited by examiner

*Primary Examiner*—Victor Batson
(74) *Attorney, Agent, or Firm*—Philip L. Bateman

(57) ABSTRACT

A disc for a rotating disc seed meter improves singulation by reducing blanks and by reducing multiples. The disc contains a circular array of openings against which the seeds are held on one side by means of a pressure differential as they are carried from a seed chamber to a seed discharge. The disc also contains a plurality of tabs on the seed-holding face of the disc. Each tab is positioned radially adjacent the trailing edge of its associated opening. The tabs improve singulation by reducing blanks and multiples, and reduce variation in seed intervals by reducing the variation in seed trajectory

4 Claims, 2 Drawing Sheets

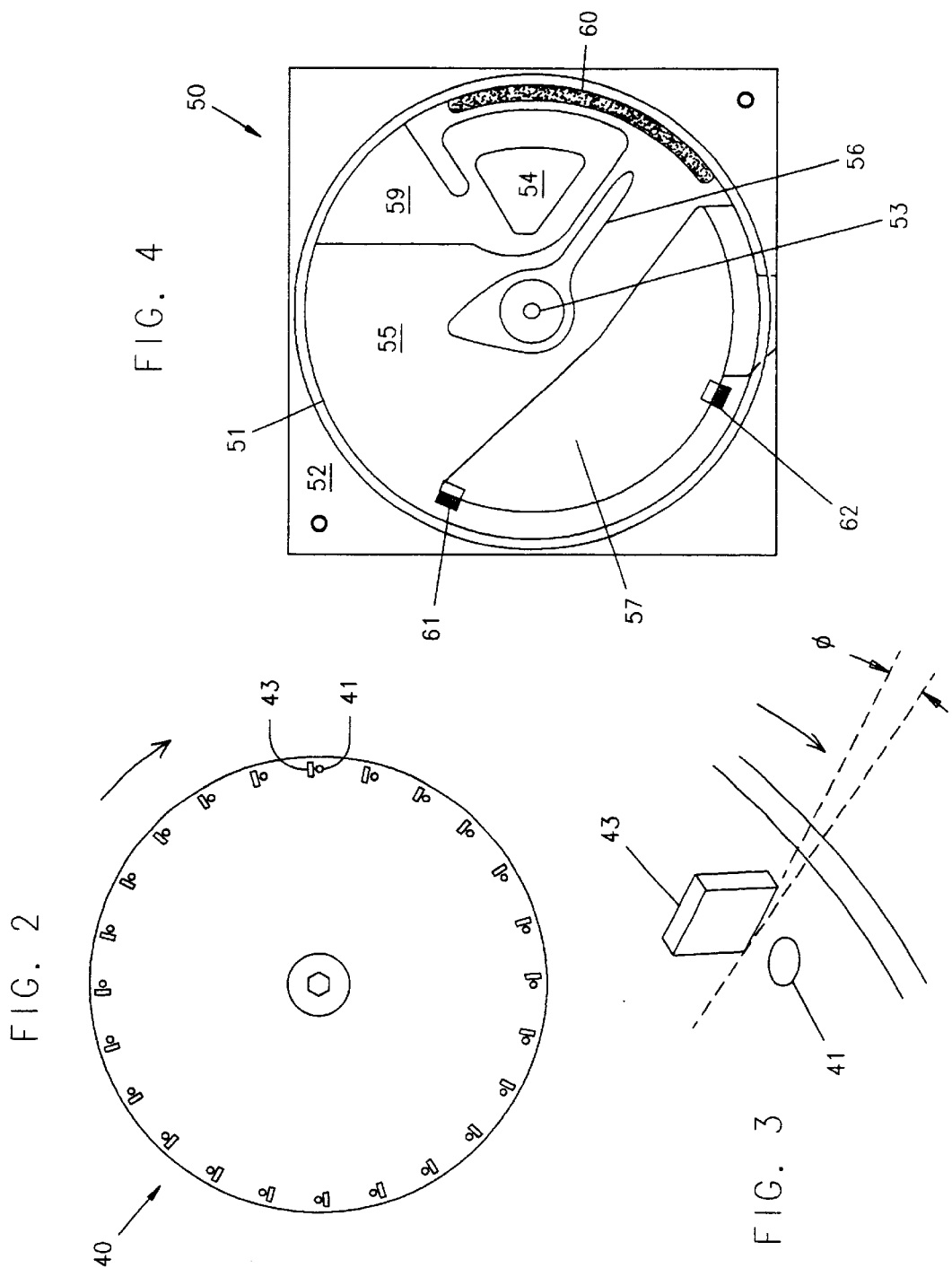

SEED METER

CROSS-REFERENCE TO RELATED APPLICATION

This application claims the benefit of U.S. Provisional Application Ser. No. 60/307,053, Jul. 20, 2001.

FIELD OF THE INVENTION

This invention relates to seed meters. More particularly, this invention relates to rotating disc seed meters.

BACKGROUND OF THE INVENTION

Seed planters are used in modern high-production farm operations to create a trench in the soil, deposit seeds into the bottom of the trench at accurate intervals, and then cover the trench. Seed planters are pulled behind a tractor and have a plurality of individual planter units arranged side-by-side so a plurality of parallel rows can be simultaneously planted. A conventional corn and soybean seed planter is disclosed in Deckler, U.S. Pat. No. 3,999,690, issued Dec. 28, 1976, which is incorporated by reference. Each individual seed planter unit contains a seed hopper for holding a quantity of seeds, a seed meter for metering the seed, and a seed conveyor through which the seeds pass from the meter to the soil. Each seed planter unit also contains a pair of trench forming discs in front of the drop chute and a soil packing wheel behind the drop chute.

The seed meter disclosed in Deckler employs a rotating disc. The rotating disc contains a plurality of openings in indentations arranged in a circular array which hold the seeds by means of a pressure differential between the seed-holding side of the disc and the opposite side. As the disc rotates, an opening passes through a seed chamber, picks up a single seed, and then releases the seed at a discharge section where the pressure differential is reduced. In this type of seed meter, it is very important that each opening is "singulated," i.e., that each opening contain one and only one seed. If an opening does not contains a seed (a "blank") or contains two or more seeds (a "multiple"), the planted field will contain plants that are not optimally spaced.

Uneven seed spacing also occurs with the Deckler seed meter because the seeds are released from the meter at varying trajectories. The variance in trajectories creates a difference in the time it takes the seed to pass through the seed conveyor. These differences, in turn, cause the interval between planted seeds to vary. The variance is increased as the speed of the tractor pulling the planter increases.

Stufflebeam et al., U.S. Pat. No. 5,848,571, issued Dec. 15, 1998, which is incorporated by reference, discloses a rotating disc seed meter with a singulator assembly. The singulator assembly is stationary and includes seed engaging members arranged on opposite sides of the path of travel of the openings in the seed disc. If two or more seeds are held at a single opening, Stufflebeam et al. state that the singulator assembly helps to dislodge all but one. However, the singulator assembly plays no role in preventing blanks.

Accordingly, a demand exists for a rotating disc seed meter that improves singulation by reducing blanks and by reducing multiples. A demand also exists for a rotating disc seed meter that reduces the variation in seed intervals by reducing the variation in seed trajectory.

SUMMARY OF THE INVENTION

The general objects of this invention are to provide an improved rotating seed meter and an improved rotating disc for such a meter. One more particular object is to provide a seed meter that improves singulation by reducing blanks and by reducing multiples. Another more particular object is to provide a seed meter that reduces the variation in seed intervals by reducing the variation in seed trajectory.

I have invented an improved disc for a rotating disc seed meter. The disc comprises a circular array of openings against which the seeds are held on one side by means of a pressure differential as they are carried from a seed chamber to a seed discharge, and a plurality of tabs on the seed-holding face of the disc, a tab associated with each opening, each tab being positioned radially adjacent the trailing edge of its associated opening to improve singulation by reducing blanks and multiples, and to reduce variation in seed intervals by reducing the variation in seed trajectory.

I have also invented an improved rotating disc seed meter. The meter comprises (a) a housing comprising a seed inlet, an internal seed chamber, a seed discharge, and an opening communicating with a pressure differential source; and (b) a rotating disc supported within the housing. The rotating disc provides a partial seal between the seed chamber and the pressure differential source. The rotating disc comprises a circular array of openings against which the seeds are held on one side by means of a pressure differential as they are carried from a seed chamber to a seed discharge, and a plurality of tabs on the seed-holding face of the disc. A tab is associated with each opening. Each tab is positioned radially adjacent the trailing edge of its associated opening to improve singulation by reducing blanks and multiples, and to reduce variation in seed intervals by reducing the variation in seed trajectory.

The seed meter enables seeds to be placed into an underlying trench at optimal intervals for two primary reasons. First, the seed meter improves singulation by reducing blanks and by reducing multiples. Second, the seed meter reduces the variation in seed intervals by reducing the variation in seed trajectory.

BRIEF DESCRIPTION OF THE DRAWINGS

FIG. 2 is a front view of the rotating disc of the seed meter.

FIG. 3 is a detail of an opening and a tab of the rotating disc.

FIG. 4 is a front view of the chamber of the seed meter.

DETAILED DESCRIPTION OF THE INVENTION

Figure 1:
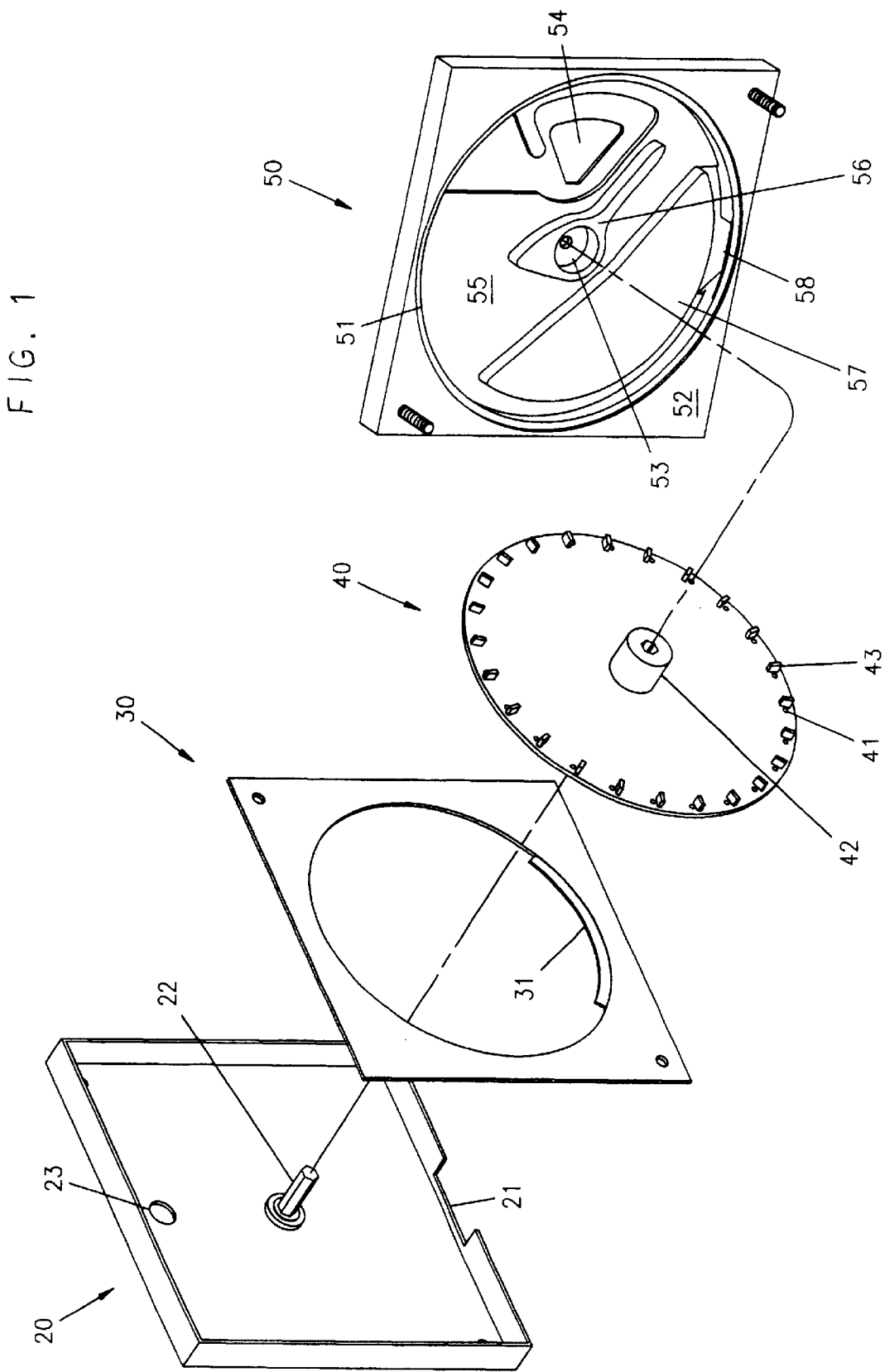
FIG. 1 is an exploded perspective view of a preferred embodiment of the seed meter of this invention.

This invention is best understood by reference to the drawings. A preferred embodiment of the seed meter 10 of this invention is shown in FIGS. 1 to 4. The seed meter contains four primary components: a shell 20, a seal 30, a rotating disc 40, and an outer housing 50. Each of these primary components is discussed in turn.

The shell 20 is permanently mounted on the seed planter. The shell resembles a square tray having low walls around its perimeter to define an interior space. The bottom wall contains a cut-out 21 to allow seeds to be discharged from the meter. A drive shaft 22 extends through the front and back of the shell. The driven end of the shaft extends outwardly from the back of the shell. The driven end contains a gear, pulley, or the like which is connected to a rotary source (not shown). The drive shaft is turned at a speed to discharge seeds at the optimal seed interval from the seed meter. An opening 23 provides communication between the interior of the shell and a vacuum source.

The seal 30 fits within the shell to define a circular vacuum chamber. An arc-shaped annular extension 31 is located along the bottom of the vacuum chamber. As discussed in detail below, the extension reduces the pressure differential across the rotating disc which, in turn, allows the seeds to disengage from the disc.

The rotating disc 40 contains a circular array of openings 41 which hold the seeds by means of the pressure differential across the disc. The disc generally contains about ten to forty equally-spaced openings. The number of openings and the diameter of the openings are dependent on the size and type of seed to be planted. For example, when used with corn, the rotating disc preferably contains about thirty circular openings and the diameter of the openings is about one-eighth inch. When used with smaller seeds, such as sugar beets, the number of openings is greater, up to about sixty, and the diameter of the openings is smaller, generally about one-thirty-second inch. The openings are generally set inwardly from the edge of the disc a distance of about one-eighth to one-half inch so that a portion of the disc overlaps the housing to create a seal on the seed-holding face of the disc. The rotating disc also contains a guide shaft 42 that fits onto, and engages, the drive shaft of the shell. In the embodiment shown, the drive shaft and guide shaft engage due to their hexagonal shape. However, alternative engagement means are suitable. The rotating disc extends outwardly over the edge of the seal to create a seal on the non-seed-holding face of the disc. The disc rotates in a clockwise direction, when viewed from the seed-holding face. The direction of rotation is shown by arrows in FIGS. 1 to 3. In the above respects, the disc is conventional.

Unlike conventional rotating discs, the rotating disc of this invention contains a plurality of tabs 43 on the seed-holding face of the disc. A tab is located adjacent the trailing edge of each opening and its seed-contacting surface (the surface facing the adjacent opening) is perpendicular to the face of the disc. The seed-contacting surface of each tab is positioned radially, preferably forming an angle $\Phi$ of about zero to 30 degrees to the radius. If the tab is angled (i.e., the tab angle is not zero degrees), the angle is closed as viewed from the center of the disc looking toward the tab, as shown in FIG. 3. The optimal distance between the opening and the tab, the size of the tab, and the tab angle are dependent upon the seed to be planted. For example, when used with corn, the distance between the opening and the tab is preferably about one-sixteenth inch, the tab preferably has a width of about one-fourth inch and a height of about one-fourth inch, and the tab is radial, i.e., the tab angle is zero degrees. When used with smaller seeds, such as sugar beets, the distance between the opening and the tab is one-sixty-fourth inch or less and the width and the height of the tab is about one-sixteenth inch. The tabs serve a number of functions. They help prevent blanks by scooping seeds from the seed chamber. They help prevent multiples by limiting the space available near the opening. They help control the release trajectory of the seed by pushing the seeds after the pressure differential is reduced. And they allow the seed meter to be run at a reduced pressure differential.

The outer housing 50 mates with the shell to hold the rotating disc in position. The disc fits onto a circular ledge 51 that is recessed from the shoulder 52 of the housing a distance equal to the thickness of the disc. The outer housing contains a bore 53 into which the guide shaft of the rotating disc fits. The outer housing contains a seed inlet 54 which provides communication between a seed hopper and an inner seed chamber 55. The location of the seed inlet affects the volume of the seed pick-up region. The seed inlet is preferably located at about the three o'clock position. The seed chamber is recessed and is generally circular in shape. It contains a first fence 56 and a second fence 57 to guide seeds. The fences are at or slightly below the level of the ledge so there is little or no space between them and the disc. As discussed below, the size of both fences depend on the seed to be planted. The seed chamber further contains a discharge chute 58 that aligns with the cut-out in the shell.

The operation of the seed meter can now be considered. Seeds from the seed hopper flow down by gravity to the seed meter and into the seed chamber. Seeds entering the seed chamber are generally confined to a seed pick-up region just above the first fence (at about the three to four o'clock position as viewed in FIG. 4). The size of the first fence is dependent upon the seed to be planted. With larger seeds such as corn or soybeans, the first fence extends to within about one and one-half inches of the edge of the seed chamber. With smaller seeds, the fence extends further to the edge so as to limit the size of the seed pick-up region. Limiting the size of the seed pick-up region helps make the number of seeds in the seed pick-up region roughly constant.

As the rotating disc moves through the seed pick-up region, seeds are sucked to the openings by the pressure differential. A seed disengaging region 59, which is recessed slightly below the rest of the seed chamber, helps to direct non-singulated seeds back to the seed pick-up region. The second fence also helps direct non-singulated seeds back to the seed pickup region. The pressure differential across the disc is greatly reduced beginning at about the seven o'clock position (as viewed in FIG. 4) which is opposite the arc-shaped annular extension of the seal. Despite the release in pressure differential, the seeds continue to be carried at the opening because they are pushed along the groove between second fence and the outside wall of the seed chamber by the adjacent tab. The size of the groove corresponds to the size of the seed being planted. At the point where the seed chamber wall opens into the discharge, the seeds are flung with a constant trajectory out of the seed meter. It can be seen that the seed trajectory can be changed in numerous way, including by changing the location of the pressure differential release and/or by changing the location and shape of the seed discharge chute.

Although not essential, three brushes in the seed chamber help to guide the seeds. The first brush 60 is located in the seed pick-up region. It helps to direct the seeds toward the rotating disc, but has a resilience that prevents see from accidentally becoming bound between the tabs and the housing. The second brush 61 is located at the entrance of the second fence at about the ten o'clock position. It helps to dislodge any extra seeds that may have been picked up by the rotating disc. The third brush 62 is located at about the seven o'clock position. It helps to push back any seeds that may rise back up.

Although the preferred embodiment of the seed meter uses a vacuum on the non-seed-holding face of the rotating disc to create the necessary pressure differential, an alternative suitable operation is achieved by pressurizing the seed-holding face of the rotating disc. The seal, rotary disc, and outer housing combine to form an assembly that is optimized for a particular type of seed. When the seed to be planted is changed, it is a relatively easy and fast operation to change the assemblies on the seed planter.

I claim:

1. A disc for a rotating disc seed meter of the type that contains a seed inlet, an internal seed chamber, a seed discharge, and an opening communicating with a pressure differential source and that meters seeds, the disc comprising a seed-holding face with a circular array of circular openings against which the seeds are held by means of the pressure differential as they are carried from the seed chamber to the seed discharge and with a plurality of tabs, the seed-holding face being substantially flat except for the openings and the tabs, a tab associated with each opening, each opening having a trailing edge, each tab being positioned radially adjacent the trailing edge of its associated opening.

2. The disc of claim 1 wherein each tab is rectangular and perpendicular to the seed-holding face of the disc.

3. A rotating disc seed meter comprising:

(a) a housing comprising a seed inlet, an internal seed chamber, a seed discharge, and an opening communicating with a pressure differential source;

(b) a rotating disc supported within the housing, the rotating disc providing a partial seal between the seed chamber and the pressure differential source, the rotating disc comprising a seed-holding face with a circular array of circular openings against which seeds are held by means of the pressure differential as they are carried from the seed chamber to the seed discharge and with a plurality of tabs, the seed-holding face being substantially flat except for the openings and the tabs, a tab associated with each opening, each opening having a trailing edge, each tab being positioned radially adjacent the trailing edge of its associated opening.

4. The seed meter of claim 3 wherein each tab is rectangular and perpendicular to the seed-holding face of the disc.

* * * * *